United States Patent
Tanoue

(10) Patent No.: US 7,337,285 B2
(45) Date of Patent: Feb. 26, 2008

(54) BUFFER ALLOCATION BASED UPON PRIORITY

(75) Inventor: Kazunori Tanoue, Tokyo (JP)

(73) Assignee: NEC Corporation, Tokyo (JP)

( * ) Notice: Subject to any disclaimer, the term of this patent is extended or adjusted under 35 U.S.C. 154(b) by 482 days.

(21) Appl. No.: 10/861,460

(22) Filed: Jun. 7, 2004

(65) Prior Publication Data

US 2004/0250026 A1 Dec. 9, 2004

(30) Foreign Application Priority Data

Jun. 6, 2003 (JP) .............................. 2003-162789

(51) Int. Cl.
*G06F 12/00* (2006.01)

(52) U.S. Cl. ...................... 711/158; 711/151; 711/153; 710/40; 710/244

(58) Field of Classification Search ................ 711/158, 711/151, 153; 710/40, 244
See application file for complete search history.

(56) References Cited

U.S. PATENT DOCUMENTS

| | | | | |
|---|---|---|---|---|
| 5,535,364 | A * | 7/1996 | Resman et al. ............. | 711/151 |
| 6,076,112 | A * | 6/2000 | Hauser et al. .............. | 709/234 |
| 6,260,090 | B1 * | 7/2001 | Fuhs et al. ................. | 710/107 |
| 6,601,151 | B1 * | 7/2003 | Harris ........................ | 711/158 |
| 6,606,695 | B2 | 8/2003 | Kamano et al. | |
| 6,889,283 | B2 * | 5/2005 | Shah .......................... | 710/309 |
| 6,968,434 | B2 | 11/2005 | Kamano et al. | |
| 6,996,820 | B1 * | 2/2006 | Middleton et al. .......... | 718/100 |
| 7,035,990 | B1 * | 4/2006 | Muhlbauer .................. | 711/172 |
| 7,130,978 | B2 | 10/2006 | Kamano et al. | |
| 2004/0107322 | A1 * | 6/2004 | Mulligan .................... | 711/147 |
| 2006/0271753 | A1 | 11/2006 | Kamano et al. | |

FOREIGN PATENT DOCUMENTS

| | | |
|---|---|---|
| JP | 08-249142 | 9/1996 |
| JP | 2000-293386 | 10/2000 |
| JP | 2001-337863 | 7/2001 |

* cited by examiner

*Primary Examiner*—Sanjiv Shah
*Assistant Examiner*—Arpan Savla
(74) *Attorney, Agent, or Firm*—Foley & Lardner LLP

(57) ABSTRACT

An information recording apparatus according to the present invention manages a priority value for each host that can log in, and allocates an immediate data buffer to each host based on the priority value. The priority value changes in accordance with data transfer amount, command importance degree, etc. The information recording apparatus recalculates the priority value regularly or arbitrary, and re-performs login negotiation by requesting re-login to the hosts. The amount of buffer allocated is dynamically changed by this login negotiation, and a buffer allocation state best suited to each occasion is built. Since the present invention can dynamically determine or change the allocation amount of the immediate data buffer in accordance with the condition of each occasion, the performance of an iSCSI apparatus can be improved.

13 Claims, 8 Drawing Sheets

| HOST ID | INITIAL PRIORITY VALUE |
|---|---|
| 0001 | 50 |
| 0002 | 20 |
| 0003 | 70 |
| ... | ... |

INITIAL PRIORITY VALUE TABLE

FIG. 4A

| HOST ID | INITIAL PRIORITY VALUE | TOTAL AMOUNT OF DATA TRANSFERRED | COMMAND IMPORTANCE DEGREE | PRIORITY VALUE | BUFFER ALLOCATION AMOUNT |
|---|---|---|---|---|---|
| 0001 | 50 | 2 | 5 | 57 | 228 |
| 0003 | 70 | 6 | 3 | 79 | 316 |
| 0006 | 30 | 8 | 5 | 43 | 172 |
| ... | ... | ... | ... | ... | ... |

PRIORITY VALUE TABLE

FIG. 4B

BUFFER ALLOCATION BASED UPON PRIORITY

BACKGROUND OF THE INVENTION

1. Field of the Invention

The present invention relates to an information recording apparatus, a buffer allocation method, and a computer-readable recording medium storing a computer program, and particularly relates to an information recording apparatus having a function for immediate data transfer which is defined by iSCSI.

2. Description of the Related Art

A SCSI (Small Computer System Interface) interface is used at the input/output of an HDD (Hard Disk Drive), a disk array apparatus, etc. iSCSI allows this SCSI interface to be used on TCP/IP (Transmission Control Protocol/Internet Protocol). iSCSI is authorized by the IETF (Internet Engineering Task Force). iSCSI transfers data by encapsulating SCSI commands, responses, etc. in a TCP packet and replacing the SCSI transport with a transport for an IP network.

Immediate data transfer is one of transfers by iSCSI, and is described in a document on the Internet "drafi-ieff-ips-iscsi-20.text" URL: "http colon backslash backslash www dot haifa dot il dot ibm dot corn backslash satran backslash ips backslash draft dash ietfdash ips dash iscsi dash 20 dot txt". For example, in an ordinary data transfer, when a host issues a write command to a disk array apparatus, the disk array apparatus sends a request for data to the host. After this, the host starts data transfer to the disk array apparatus. In contrast, in an immediate data transfer, after issuing a write command to the disk array apparatus, the host starts data transfer to the disk array apparatus without waiting for a data request from the disk array apparatus. Since in the immediate data transfer, the disk array apparatus simultaneously receives a command and data, a sufficient free space is required in the buffer of the disk array apparatus.

By using immediate data transfer, it becomes possible to build an IP-based SAN (Storage Area Network). Specifically, it becomes possible for a disk array apparatus installed on a network to be logged into by a plurality of hosts. However, the capacity of the immediate data buffer of the disk array apparatus is limited. Therefore, when the disk array apparatus allocates its immediate data buffer to all the hosts logging into the disk array apparatus, the capacity of the immediate data buffer may not be enough. More specifically, in order to allow all the hosts to perform immediate data transfer, the immediate data buffer of the disk array apparatus needs to have capacity corresponding to number of sessions×maximum number of I/Os. Accordingly, if the number of sessions or the number of hosts increases, the immediate data buffer cannot secure necessary capacity required for all the hosts to perform immediate data transfer.

For example, assume that the disk array apparatus is designed to allocate 10 mega bytes of the immediate data buffer to each host. In this case, if 200 hosts log in, the memory capacity required in the immediate data buffer is 2 giga bytes. If the memory installed on the disk array apparatus has less than 2 giga bytes, the disk array apparatus cannot allocate the immediate data buffer to all the hosts that can log in.

In a case where the disk array apparatus is designed to uniformly allocate the immediate data buffer to all the hosts that can log in, the capacity of the immediate data buffer that is allocated to each host is the value obtained by dividing the total capacity of the immediate data buffer of the disk array apparatus by the maximum number of hosts that can log in. For example, in a case where a disk array apparatus having an immediate data buffer of 1 mega byte can be logged into by 200 hosts, the capacity of the immediate data buffer that is usable by each host is only 5 kilo bytes.

If the disk array apparatus allocates a sufficient capacity of the immediate data buffer to each host that logs in, the disk array apparatus can allow only a limited number of hosts to perform immediate data transfer thereto. For example, in a case where the immediate data buffer of the disk array apparatus has 10 mega bytes and the disk array apparatus allocates 1 mega byte of the immediate data buffer to each host, all the capacity of the immediate data buffer is occupied by the first ten hosts that log in. Therefore, any hosts that log in after this cannot use the immediate data buffer or perform immediate data transfer.

SUMMARY OF THE INVENTION

The present invention was made in view of the above-described problem, and an object of the present invention is to improve the performance of the iSCSI apparatus of a disk array apparatus and as a result the performance of the whole system, by allocating the immediate data buffer appropriately in accordance with the condition of each occasion.

Another object of the present invention is to make the most of the ability of a host that is high in a priority order, by efficiently utilizing the immediate data buffer of an information recording apparatus suited to immediate data transfer.

To achieve the above objects, an information recording apparatus according to a first aspect of the present invention is an information recording apparatus storing data received from a plurality of host computers, and comprises:

a buffer memory having a buffer area for temporarily storing the data;

a memory storing a priority degree for each of the host computers, the priority degree being dynamically updated based on a status of the data received from corresponding one of the host computers; and a buffer allocation unit dynamically allocating portions of the buffer area to the host computers, the portions of the buffer area allocated to the host computers having respective amounts determined based on the priority degrees of the host computers.

As described above, by storing the priority degree for each of the host computers and by determining the amount of a portion of the buffer area based on the priority degree, it is possible to increase the amount of a portion of the buffer area for a host computer whose command should be processed preferentially, and to reduce the amount of a portion of the buffer area for a host computer whose command needs not be processed preferentially. Accordingly, the ability of the host computer that is high in the priority order can be fully utilized, and the process performance of the whole system can be improved due to the effective use of the buffer memory.

The information recording apparatus may further comprise a login determination unit determining whether or not a host computer logged into the information recording apparatus, the memory may store an initial priority degree which is pre-set for each of the host computers, and a reference priority degree representing a threshold level for the initial priority degrees, the login determination unit may determine whether or not the initial priority degree of a host computer stored in the memory is higher than the reference priority degree stored in the memory, when the host computer logs into the information recording apparatus, and the buffer allocation unit may allocate a portion of the buffer area corresponding to the determined amount to the host computer, in a case where the login determination unit determines that the initial priority degree of the host computer is higher than the reference priority degree.

By arranging that a portion of the buffer area should not be allocated in a case where the initial priority degree pre-set for each host computer is lower than the reference priority degree, it is possible to avoid a situation that the buffer area is occupied by host computers having a low priority degree and therefore a buffer area cannot be allocated to host computer which logs in afterwards.

In the information recording apparatus, the priority degree may be a numerical value, the value being large when the priority degree is high, while being small when the priority degree is low, and the buffer allocation unit may determine an amount of a portion of the buffer area to be allocated to a host computer by "(the priority degree of the host computer/total of the priority degrees of all host computers to which portions of the buffer area are allocated)×a whole capacity of the buffer memory".

Due to this, it is possible to allocate a large portion of the buffer area to a host computer having a high priority degree, and to achieve an effective use of the buffer memory.

The information recording apparatus may further comprise a buffer freeing unit freeing portions of the buffer area already allocated to host computers, on a basis of host computer by host computer, and in a case where the buffer allocation unit cannot secure a portion of the buffer area corresponding to the determined amount in the buffer memory when attempting to allocate a portion of the buffer area to a host computer, the buffer freeing unit may free a portion of the buffer area already allocated to another host computer for which a priority degree lower than that of the host computer is set, based on a predetermined condition, and the buffer allocation unit may allocate a portion of the buffer area corresponding to the determined amount to the host computer, in a case where a portion of the buffer area corresponding to the determined amount can be secured in the buffer memory due to the freeing of the portion of the buffer area by the buffer freeing unit.

With this design, in a case where there is not enough free space in the buffer memory when a host computer newly logs in, it is possible to compare the priority degrees and to allocate a potion of the buffer area allocated to an already logging-in host computer to the newly logging-in host computer.

The information recording apparatus may further comprise a priority degree determination unit, the memory may store for each host computer data representing the status corresponding to an amount of data and/or a usage degree of various commands received from the host computer and from a time the host computer logged into the information recording apparatus, the priority degree determination unit may determine the priority degree of each host computer that is stored in the memory and updating the stored priority degree, based on the amount of data and/or the usage degree of various commands and the initial priority degree stored in the memory, and the buffer allocation unit may determine a reallocation amount of a portion of the buffer area to be allocated to each host computer that has been logged into the information recording apparatus based on the priority degree determined by the priority degree determination unit, and allocate a portion of the buffer area corresponding to the determined reallocation amount to each host computer.

By determining the priority degree regularly or in response to an arbitrary trigger and dynamically changing the allocation amount of a portion of the buffer area of each host computer based on the determined priority degree, it is possible to realize a buffer area allocation state that is suitable for the condition at each occasion.

In the information recording apparatus, the priority degree may be a numerical value, the value being large when the priority degree is high, while being small when the priority degree is low, and the priority degree determination unit may determine the priority degree of a host computer by "(the amount of data transferred from the host computer/total amounts of data transferred from all host computers to which portions of the buffer area are allocated)+(the usage degree of various commands from the host computer/total of usage degrees of various commands from all host computers to which portions of the buffer area are allocated)+the initial priority degree of the host computer".

By highly setting the priority degree of a host computer from which large amount of data is transferred and whose usage degree of various commands is high, it is possible to allocate a large portion of the buffer area to a host computer that needs to be processed preferentially.

The information recording apparatus may further comprise a login determination unit determining whether or not a host computer logged into the information recording apparatus, and the freeing of the portion of the buffer area already allocated to a host computer by the buffer freeing unit may be achieved in a manner that the buffer freeing unit requests the host computer to re-log into the information recording apparatus, and the login determination unit rejects allocation of a portion of the buffer area to the host computer, when the host computer re-logs into the information recording apparatus.

In the information recording apparatus, the allocation of the portion of the buffer area corresponding to the determined reallocation amount to each host computer by the buffer allocation unit may be achieved in a manner that the buffer allocation unit requests each host computer to re-log into the information recording apparatus, and the login determination unit changes an amount of a portion of the buffer area to be allocated to each host computer, when each host computer re-logs into the information recording apparatus.

A method according to a second aspect of the present invention is a method for receiving data from a plurality of host computers and storing the received data in an information recording apparatus, and comprises the steps of:

storing a priority degree for each of the host computers in a memory, the priority degree being dynamically updated based on a status of the data received from corresponding one of the host computers;

determining respective amounts of portions of a buffer area of a buffer memory to be allocated to respective host computers based on the priority degrees of the host computers; and dynamically allocating the portions of the buffer area of the buffer memory having the amounts determined in the determining step, to the host computers.

A buffer allocation method according to a third aspect of the present invention is a method which allocates a portion of a buffer area of a buffer memory for temporarily storing data and included in a subordinate apparatus which stores data received from a plurality of superordinate apparatuses to each superordinate apparatus, and comprises:

an allocation amount determination step of determining an amount of a portion of the buffer area to be allocated to each superordinate apparatus, based on a priority degree which is set for each superordinate apparatus and stored in a memory of the subordinate apparatus; and a buffer allocating step of allocating a portion of the buffer area corresponding to the amount determined in the allocation amount determination step to a superordinate apparatus for which a high priority degree is set, preferentially over a superordinate apparatus for which a low priority degree is set.

In the buffer allocation method, in the allocation amount determination step, an amount of a portion of the buffer area to be newly allocated to a new superordinate apparatus to which a portion of the buffer area has not yet been allocated, may be determined, and the buffer allocating step may include:

an amount securing determination step of determining whether or not a portion of the buffer area corresponding to the amount determined in the allocation amount determination step can be secured in the buffer memory;

a buffer freeing step of freeing portions of the buffer area already allocated to some or all of superordinate apparatuses for which a priority degree lower than that of the new superordinate apparatus is set, in a case where it is determined in the amount securing determination step that the portion of the buffer area cannot be secured; and a newly allocating step of allocating a portion of the buffer area corresponding to the amount determined in the allocation amount determination step to the new superordinate apparatus, by assigning amounts of portions of the buffer area freed in the buffer freeing step to the amount determined in the allocation amount determination step.

In the buffer allocation method, the buffer freeing step may include:

a re-login requesting step of requesting a superordinate apparatus to which a portion of the buffer area is already allocated, to re-log into the subordinate apparatus; and an allocation rejecting step of rejecting allocation of a portion of the buffer area to the superordinate apparatus, when the superordinate apparatus re-logs into the subordinate apparatus in accordance with a request in the re-login requesting step, and the freeing of portions of the buffer area in the buffer freeing step may be realized by rejection of allocation of a portion of the buffer area in the allocation rejecting step.

The buffer allocation method may further comprise a priority degree changing step of changing the priority degree of each superordinate apparatus stored in the memory, in the allocation amount determination step, a reallocation amount of a portion of the buffer area to be allocated to each superordinate apparatus that has been logged into the subordinate apparatus may be determined based on the priority degree changed in the priority degree changing step, and in the buffer allocating step, a portion of the buffer area corresponding to the reallocation amount determined in the allocation amount determination step may be allocated to each superordinate apparatus.

In the buffer allocation method, the buffer allocating step may include:

a re-login requesting step of requesting each superordinate apparatus that has been logged into the subordinate apparatus to re-log into the subordinate apparatus; and an amount changing step of changing the amount of the portion of the buffer area to be allocated to each superordinate apparatus, when each superordinate apparatus re-logs into the subordinate apparatus in accordance with a request in the re-login requesting step, and the allocation of a portion of the buffer area corresponding to the reallocation amount to each superordinate apparatus in the buffer allocating step may be realized by changing of the amount of the portion of the buffer area to be allocated to each superordinate apparatus in the amount changing step.

A computer-readable recording medium storing a computer program according to a fourth aspect of the present invention is a medium storing a computer program for receiving data from a plurality of host computers and storing the received data in an information recording apparatus, and the computer program comprises the steps of:

storing a priority degree for each of the host computers in a memory, the priority degree being dynamically updated based on a status of the data received from corresponding one of the host computers;

determining respective amounts of portions of a buffer area of a buffer memory to be allocated to respective host computers based on the priority degrees of the host computers; and dynamically allocating the portions of the buffer area of the buffer memory having the amounts determined in the determining step, to the host computers.

A computer-readable recording medium storing a computer program according to a fifth aspect of the present invention is a medium storing a computer program for allocating a portion of a buffer area of a buffer memory for temporarily storing data and included in a subordinate apparatus which stores data received from a plurality of superordinate apparatuses to each superordinate apparatus, and the computer program comprises:

an allocation amount determination step of determining an amount of a portion of the buffer area to be allocated to each superordinate apparatus, based on a priority degree which is set for each superordinate apparatus and stored in a memory of the subordinate apparatus; and a buffer allocating step of allocating a portion of the buffer area corresponding to the amount determined in the allocation amount determination step to a superordinate apparatus for which a high priority degree is set, preferentially over a superordinate apparatus for which a low priority degree is set.

In the computer-readable recording medium storing the computer program, in the allocation amount determination step, an amount of a portion of the buffer area to be newly allocated to a new superordinate apparatus to which a portion of the buffer area has not yet been allocated, may be determined, and the buffer allocating step may include:

an amount securing determination step of determining whether or not a portion of the buffer area corresponding to the amount determined in the allocation amount determination step can be secured in the buffer memory;

a buffer freeing step of freeing portions of the buffer area already allocated to some or all of superordinate apparatuses for which a priority degree lower than that of the new superordinate apparatus is set, in a case where it is determined in the amount securing determination step that the portion of the buffer area cannot be secured; and a newly allocating step of allocating a portion of the buffer area corresponding to the amount determined in the allocation amount determination step to the new superordinate apparatus, by assigning amounts of portions of the buffer area freed in the buffer freeing step to the amount determined in the allocation amount determination step.

In the computer-readable recording medium storing the computer program the buffer freeing step may include:

a re-login requesting step of requesting a superordinate apparatus to which a portion of the buffer area is already allocated, to re-log into the subordinate apparatus; and an allocation rejecting step of rejecting allocation of a portion of the buffer area to the superordinate apparatus, when the superordinate apparatus re-logs into the subordinate apparatus in accordance with a request in the re-login requesting step, and the freeing of portions of the buffer area in the buffer freeing step may be realized by rejection of allocation of a portion of the buffer area in the allocation rejecting step.

In the computer-readable recording medium storing the computer program, the computer program may further comprise a priority degree changing step of changing the priority degree of each superordinate apparatus stored in the memory, in the allocation amount determination step, a reallocation amount of a portion of the buffer area to be allocated to each superordinate apparatus that has been logged into the subordinate apparatus may be determined based on the priority degree changed in the priority degree changing step, and in the buffer allocating step, a portion of the buffer area corresponding to the reallocation amount determined in the allocation amount determination step may be allocated to each superordinate apparatus.

In the computer-readable recording medium storing the computer program, the buffer allocating step may include:

a re-login requesting step of requesting each superordinate apparatus that has been logged into the subordinate apparatus to re-log into the subordinate apparatus; and an amount changing step of changing the amount of the portion of the buffer area to be allocated to each superordinate apparatus, when each superordinate apparatus re-logs into the subordinate apparatus in accordance with a request in the re-login requesting step, and the allocation of a portion of the buffer area corresponding to the reallocation amount to each superordinate apparatus in the buffer allocating step may be realized by changing of the amount of the portion of the buffer area to be allocated to each superordinate apparatus in the amount changing step.

BRIEF DESCRIPTION OF THE DRAWINGS

These objects and other objects and advantages of the present invention will become more apparent upon reading of the following detailed description and the accompanying drawings in which:

FIG. 4A and FIG. 4B are diagrams showing examples of tables stored in a data storage area shown in FIG. 2;

FIG. 5 is a flowchart for explaining a process for allocating an immediate data buffer to a host when the host logs in;

DETAILED DESCRIPTION OF THE PREFERRED EMBODIMENTS

Figure 1:
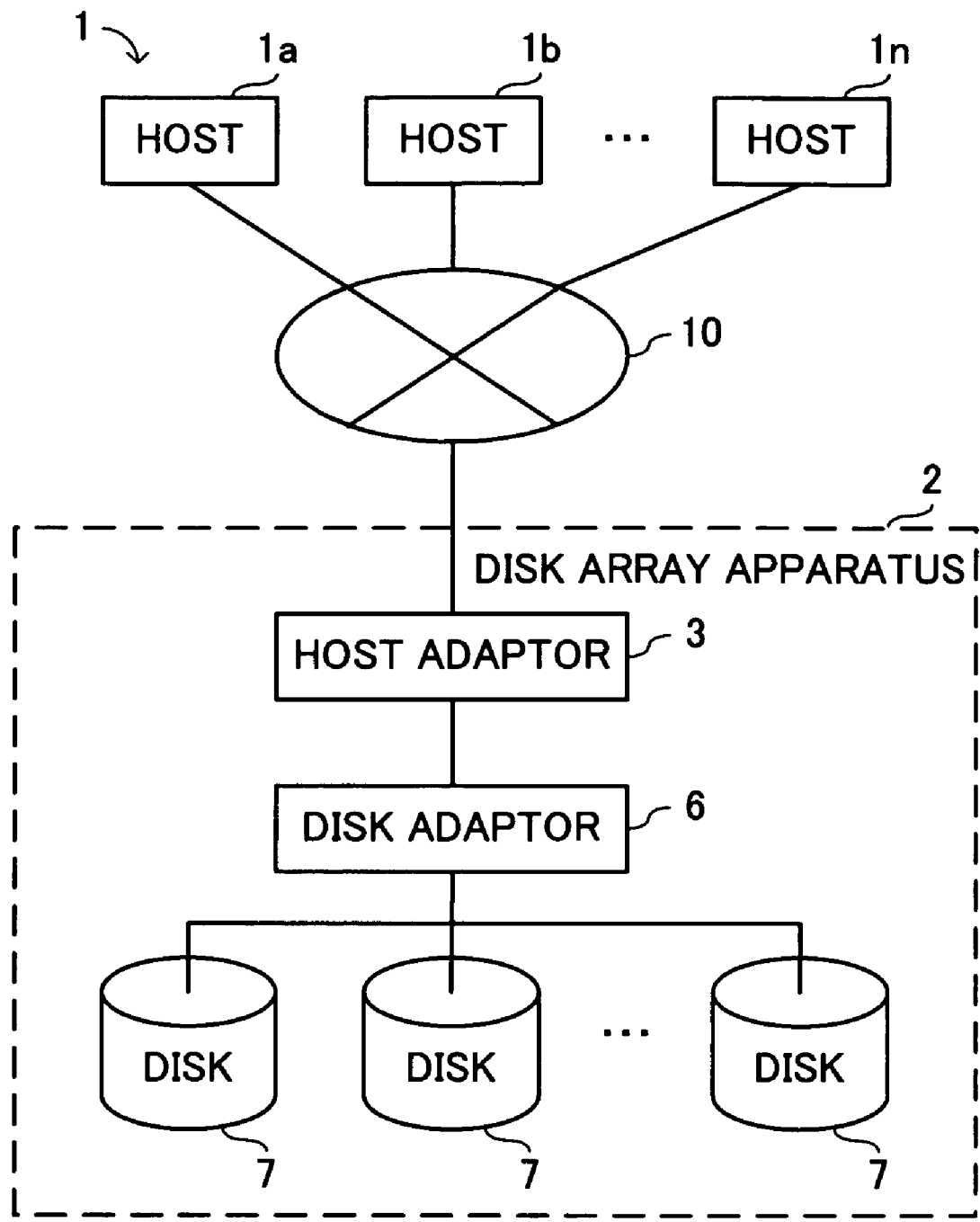
FIG. 1 is a block diagram showing a configuration of a system including a disk array apparatus according to an embodiment of the present invention.

Embodiments of the present invention will be specifically explained with reference to the attached drawings. FIG. 1 is a block diagram showing the configuration of a system including a disk array apparatus according to an embodiment of the information recording apparatus of the present invention. A plurality of host computers (hosts) $1a$, $1b$, . . . , $1n$ and a disk array apparatus 2 which is one example of the information recording apparatus of the present invention are connected via an IP (Internet Protocol) network 10. The host 1 corresponds to the superordinate apparatus, if the disk array apparatus 2 is regarded as the subordinate apparatus. The host 1 sends data to be stored in the disk array apparatus 2 to the disk array apparatus 2, and receives data stored in the disk array apparatus 2 from the disk array apparatus 2. The disk array apparatus 2 has a function as an iSCSI apparatus directly connected to the IP network 10. The disk array apparatus 2 comprises a host adaptor 3, a disk adaptor 6, and a plurality of disks 7. The disk array apparatus 2 reads and writes data from and to the disks 7 in accordance with a request from the host 1 sent via the IP network 10. The host adaptor 3 includes a processor, a memory, etc., and mainly performs a process for data transfer between the host 1 and the disk array apparatus 2, a process for accepting login, etc. The disk adaptor 6 mainly performs writing and reading of data to and from the disks 7 by controlling the disks 7.

Figure 2:
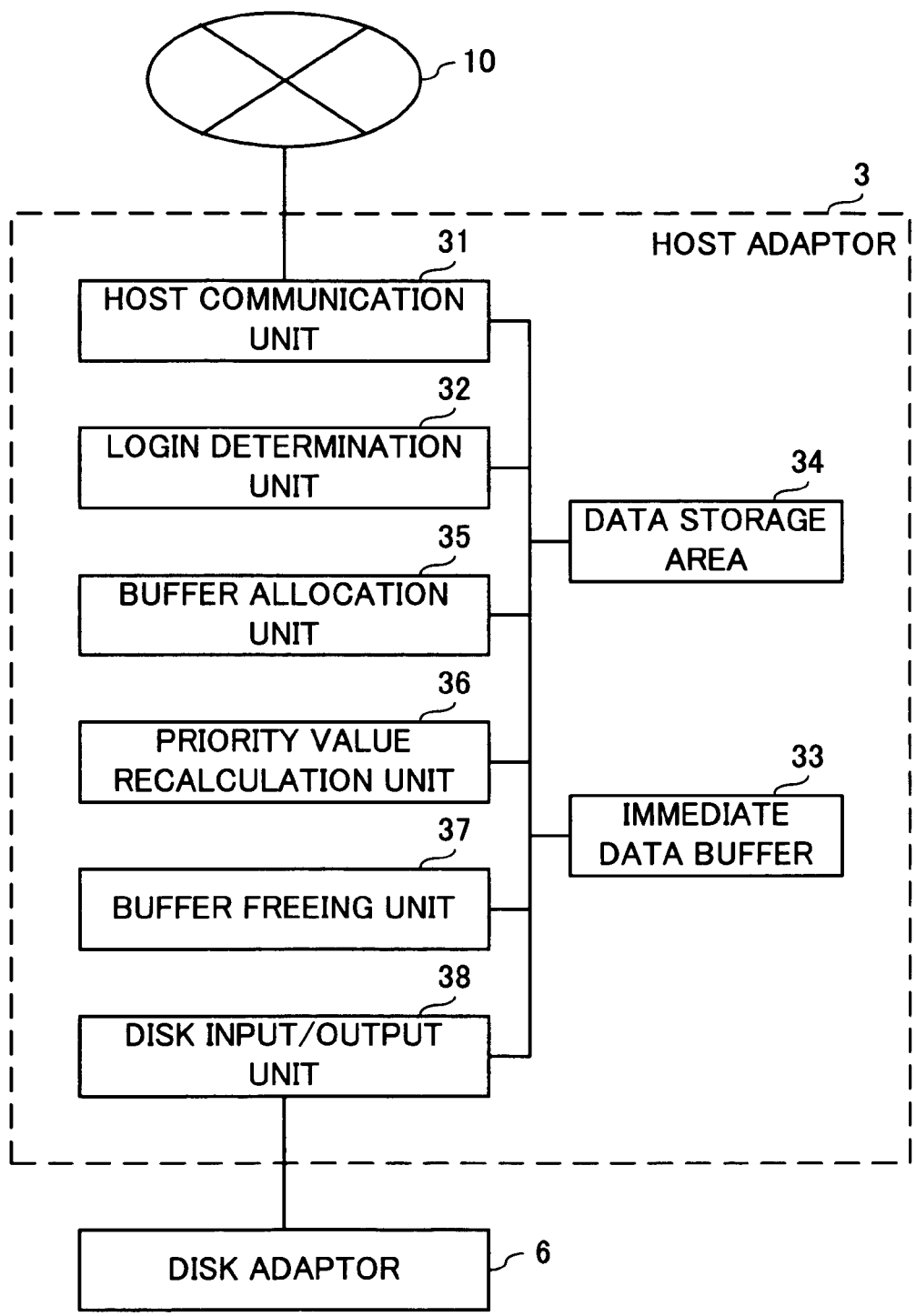
FIG. 2 is a block diagram showing a functional configuration of a host adaptor shown in FIG. 1.

FIG. 2 is a block diagram showing the functional configuration of the host adaptor 3. The host adaptor 3 has a function for allocating an immediate data buffer to the host 1. The host adaptor 3 comprises a host communication unit 31, a login determination unit 32, an immediate data buffer 33, a data storage area 34, a buffer allocation unit 35, a priority value recalculation unit 36, a buffer freeing unit 37, and a disk input/output unit 38. The host communication unit 31 is connected to the IP network 10, and processes a login/logout performed by the host 1 to the disk array apparatus 2 and data transfer, etc. The login determination unit 32 conducts a negotiation between the host 1 and the disk array apparatus 2 when the host 1 logs into the disk array apparatus 2, and determines various parameters related to immediate data transfer defined by iSCSI. The immediate data buffer 33 temporarily stores transfer data (write data) received from the host 1 in immediate data transfer after the host 1 issues a write command to the disk array apparatus 2. The immediate data buffer 33 has a buffer area, and a portion of the buffer area of the immediate data buffer 33 is allocated to the host 1. The data storage area 34 stores various tables used for allocating the immediate data buffer 33 to the plurality of hosts 1. The buffer allocation unit 35 allocates a part of the buffer capacity (size) of the immediate data buffer 33 to each of the plurality of hosts 1. The priority value recalculation unit 36 recalculates a priority value set for each of the plurality of hosts 1 if necessity arises. The priority value is a numerical value representing the degree of priority of each host over other hosts in buffer allocation when a plurality of hosts uses the immediate data buffer 33. In this embodiment, a large priority value is set for a host that is high in the priority order, and a small priority value is set for a host that is low in the priority order. The buffer freeing unit 37 frees the immediate data buffer 33 that is allocated to a host having a small priority value to secure a buffer to be allocated to a host having a large priority value in a predetermined case. The disk input/output unit 38 is connected to the disk adaptor 6, and transfers data exchanged between the disks 7 and the host 1.

A negotiation performed by the login determination unit 32 related to immediate data transfer will now be explained.

Various parameters determined by a negotiation between the host 1 and the disk array apparatus 2 related to immediate data transfer include an immediate data parameter, a first burst length parameter, etc. The immediate data parameter is a parameter for determining use/non-use of immediate data transfer. The first burst length parameter is a parameter indicating the maximum data length in immediate data transfer.

If both of the host 1 and the disk array apparatus 2 declare "immediate data=yes" in a negotiation, immediate data transfer becomes possible between the host 1 and the disk array apparatus 2. The maximum data length in the immediate data transfer is determined by first burst length keys declared by the host 1 and the disk array apparatus 2 to each other. Specifically, the smallest one of the key values declared by them is adopted. In a case where the transfer data length declared by the disk array apparatus 2 is shorter than the transfer data length declared by the host 1, the host 1 cannot perform the immediate data transfer that exceeds the key value adopted.

Figure 3:
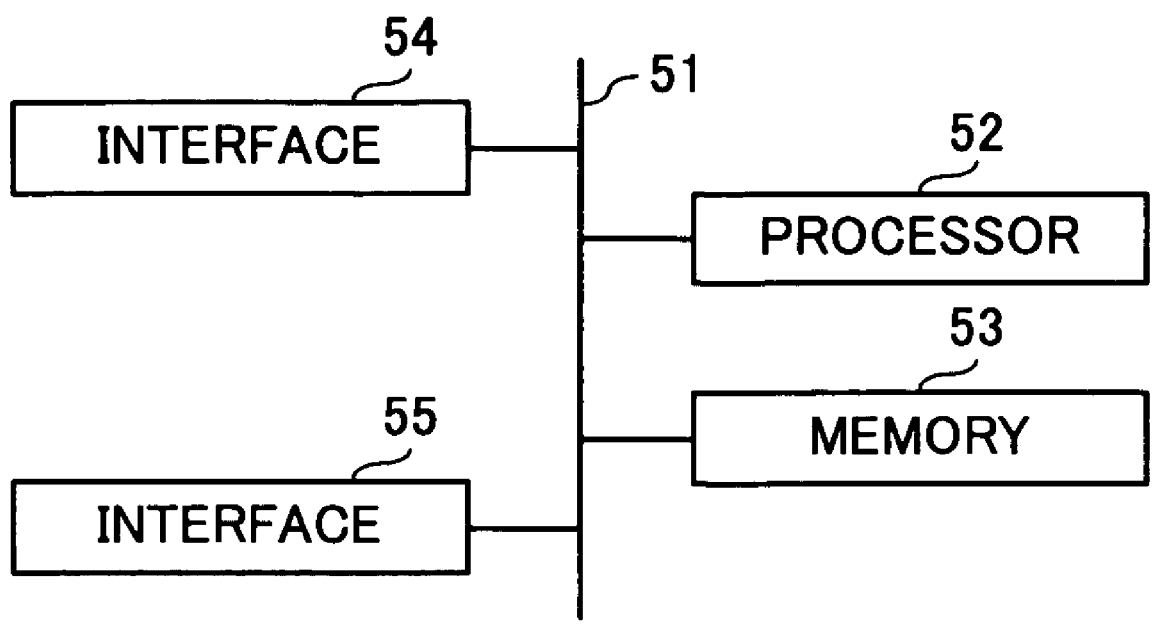
FIG. 3 is a block diagram showing a physical configuration of the host adaptor shown in FIG. 1.

FIG. 3 is a block diagram showing the physical configuration of the host adaptor 3. A processor 52 performs calculation in accordance with a process instruction stored in a memory 53, and controls a memory 53 and interfaces 54 and 55 via a bus 51. The interface 54 is connected to the IP network 10, and the interface 55 is connected to the disk adaptor 6.

The operation of the host communication unit 31 constituting the host adaptor 3 shown in FIG. 2 is realized by the processor 52 controlling the interface 54, etc. The operation of the disk input/output unit 38 is realized by the processor 52 controlling the interface 55, etc. Further, the operations of the login determination unit 32, the buffer allocation unit 35, the priority value recalculation unit 36, and the buffer freeing unit 37 are realized by the processor 52 controlling the memory 53, etc. The data storage area 34 and the immediate data buffer 33 are realized by some part of the memory 53.

FIG. 4A and FIG. 4B are diagrams showing examples of tables stored in the data storage area 34. FIG. 4A shows an initial priority value table T1 on which identification information (host ID) of every host that is permitted to log into the disk array apparatus 2 and an initial priority value of every host are registered. As the host ID, an identifier used in network communication such as initiator name parameter and initiator alias parameter defined by iSCSI, authentication key, IP address for TCP/IP, MAC address, etc. is used. The initial priority value is the initial value of the priority value, and can be set arbitrarily by the manager of the disk array apparatus 2. The manager sets a large value as the initial priority value for a host to which the immediate data buffer 33 should be allocated preferentially, and sets a small value as the initial priority value for a host which needs not to be taken care of preferentially. The host ID and initial priority value are managed host by host.

FIG. 4B shows a priority value table T2 on which identification number (host ID), initial priority value, total amount of data transferred after login, command importance degree after login, current priority value, and buffer allocation amount of the host which is actually logging into the disk array apparatus 2 are registered. These registered data are managed host by host. The priority value table T2 is referred to when priority values are recalculated by the priority value recalculation unit 36, when the buffer allocation amount is changed, etc.

The total amount of data transferred and command importance degree are values used for calculating the priority value of each host. The total amount of data transferred is used for increasing the priority value of a host which sends a large amount of data. The command importance degree is used for increasing the priority value of a host which uses many important commands. The total amount of data transferred and command importance degree of each host are updated as needed by the host communication unit 31, and registered on the priority value table T2. The total amount of data transferred is calculated by accumulating the amount of data which has been transferred when transfer of write data is completed. The command importance degree is obtained by quantifying the frequency of usage of various commands issued by the host 1 to the disk array apparatus 2, based on the degree of importance of each command. For example, weighted value of each command from a host is pre-set by the manager, and the command importance degree is calculated by accumulating the weighted values each time 110 (Input/Output) by a command from a host is processed. For example, the manager may set a large value for a write command for user data, and set a small value for a command for monitoring the condition of the disk array apparatus 2 or for a command for manipulating statistical information. By such setting, the command importance degree of a host that frequently writes user data becomes a large value, and the command importance degree of such a host as a managing terminal that checks the operational condition of the disk array apparatus 2 becomes a small value. A table of values to be accumulated at each I/O which are used for calculating the command importance degree is stored in the data storage area 34.

In the data storage area 34, various values are stored in addition to the initial priority value table T1, the priority value table T2, the table of values to be accumulated at each I/O.

For example, a login reference value to be described later is stored in the data storage area 34. This login reference value is a reference priority value as a border used by the login determination unit 32 to determine whether or not to permit the host 1 to perform immediate data transfer when the host 1 requests immediate data transfer to the disk array apparatus 2. The login determination unit 32 compares the initial priority value of the host 1 which requests immediate data transfer with the login reference value, and permits the host 1 to perform immediate data transfer when the initial priority value is equal to or greater than the login reference value. The login reference value can be arbitrarily set by the manager of the disk array apparatus 2. The manager sets the login reference value together with the initial priority value of each host.

Figure 5:
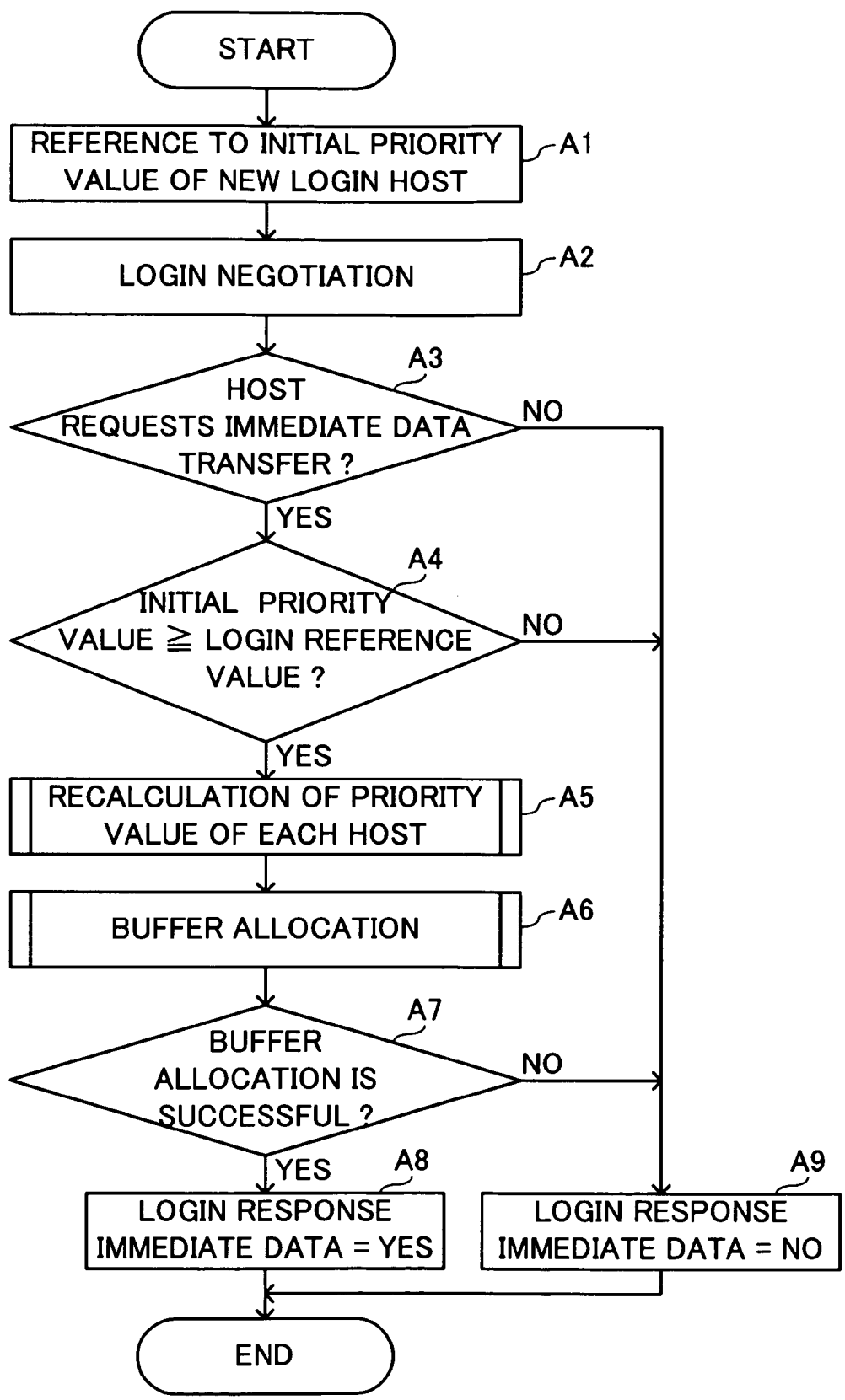

The operation of the host adaptor 3 configured as described above will now be explained with reference to FIG. 5 and following drawings. FIG. 5 is a flowchart for explaining a process in which the disk array apparatus 2 allocates the immediate data buffer 33 to the host 1a when the host 1a logs into the disk array apparatus 2. First, when the host communication unit 31 receives a login request from the host 1a, the login determination unit 32 refers to the initial priority value table T1 in the data storage area 34 to refer to the initial priority value of the host 1a based on the host ID included in the login request (step A1).

After this, a login negotiation for determining various parameters related to immediate data transfer defined by iSCSI is started between the host 1a and the login determination unit 32 (step A2). Next, the login determination unit 32 determines whether or not the host 1a requests immediate data transfer (step A3). In a case where the host 1a sends a parameter for requesting use of immediate data transfer (step A3: Yes), the login determination unit 32 determines whether or not the initial priority value referred to in step A1 is equal to or greater than the login reference value stored in the data storage area 34 (step A4).

In a case where a host 1a which newly requests login (a new login host) does not request immediate data transfer (step A3: No) or in a case where the initial priority value of the new login host 1a is smaller than the login reference value (step A4: No), the login determination unit 32 sends a login response representing that "immediate data=no", i.e., immediate data transfer is not permitted, to the new login host 1a (step A9). In this case, immediate data transfer is not performed but ordinary data transfer is performed between the new login host 1a and the disk array apparatus 2.

In a case where the initial priority value of the new login host 1a is equal to or greater than the login reference value in step A4 (step A4: Yes), the priority value of every host 1 that has already logged in and is now permitted to perform immediate data transfer is recalculated based on the total amount of data transferred and command importance degree, etc. on the priority table T2 to update the priority value on the priority value table T2 (step A5). The process for priority value recalculation will be specifically described later.

After this, allocation of the immediate data buffer 33 to the new login host 1a is performed based on the recalculated priority values (step A6). The buffer allocation process will be described in detail later, but the outline of the process will now be explained. First, a buffer allocation amount representing the capacity (size) of immediate data buffer to be allocated to the new login host 1a is calculated based on the priority value of the new login host 1a. The buffer allocation unit 35 attempts to secure this buffer allocation amount in the immediate data buffer 33. However, in some case, the immediate data buffer 33 is already allocated to other hosts 1 and the buffer allocation amount of the new login host 1a can not be fully secured in the immediate data buffer 33. In this case, the buffer allocation unit 35 attempts to secure the buffer allocation amount of the new login host 1a in the immediate data buffer 33 by applying capacity of immediate data buffer already allocated to other hosts 1 that have a smaller priority value than the new login host 1a to the buffer allocation amount of the new login host 1a.

Next, it is determined whether or not the allocation of the immediate data buffer 33 to the new login host 1a in the buffer allocation process in step A6 is successful (step A7).

In a case where the allocation of the immediate data buffer 33 is successful (step A7: Yes), the login determination unit 32 sends a login response representing that immediate data=yes to the new login host 1a (step A8). In this case, immediate data transfer is performed between the new login host 1a and the disk array apparatus 2. On the contrary, in a case where the allocation is unsuccessful (step A7: No), the login determination unit 32 sends a login response representing that immediate data=no to the new login host 1a (step A9). In this case, ordinary data transfer is performed between the new login host 1a and the disk array apparatus 2.

Next, the priority value recalculation process in step A5 in FIG. 5 will be specifically explained with reference to a flowchart shown in FIG. 6.

In this priority value recalculation process, the priority value of every host 1 that has already logged in and is currently permitted to perform immediate data transfer is recalculated. The recalculation of priority value is done by calculating a write command ratio and a command importance degree ratio for each host and adding the write command ratio, the command importance degree, and the initial priority value. First, the write command ratio of each host is calculated (step B1). The write command ratio is calculated based on the total amount of data transferred registered on the priority value table T2 shown in FIG. 4B. Specifically, for example, in a case where the host 1b is one of the hosts that are currently permitted to perform immediate data transfer and thus the write command ratio of the host 1b is to be calculated, calculation of "write command ratio of host 1b=total amount of data transferred of host 1b/sum total of total amounts of data transferred of all hosts 1 currently permitted to perform immediate data transfer" is performed. Next, the command importance degree ratio of each host is calculated (step B2). The command importance degree ratio is calculated based on the command importance degree registered on the priority value table T2. Specifically, for example in a case where the command importance degree ratio of the host 1b is to be calculated, calculation of "command importance degree ratio of host 1b=command importance degree of host 1b/sum total of command importance degrees of all hosts 1 currently permitted to perform immediate data transfer" is performed. After this, the priority value of each host is calculated (step B3). Specifically, in a case where the priority value of the host 1b is calculated, calculation of "priority value of host 1b write command ratio of host 1b+command importance degree ratio of host 1b+initial priority value of host 1b" is performed. The priority value recalculation unit 36 recalculates the priority value of every host 1 that is currently permitted to perform immediate data transfer, and updates the priority value registered on the priority value table T2 in the data storage area 34 (step 134).

In this process, the priority value is recalculated using both of the write command ratio of the host and the command importance degree ratio of the host. However, the priority value may be recalculated using either one of them.

Next, the buffer allocation process in step A6 of FIG. 5 will be specifically explained with reference to a flowchart shown in FIG. 7.

The buffer allocation unit 35 calculates a buffer allocation amount of the new login host 1a based on the priority value registered on the priority value table T2 shown in FIG. 4B (step C1). The buffer allocation amount of the new login host 1a is calculated by, for example, "immediate data buffer allocation amount of host 1a=(priority value of host 1a/sum total of priority values of all hosts 1 currently permitted to perform immediate data transfer)×maximum buffer capacity". Note that buffer allocation amount≦predetermined maximum value must be satisfied. Next, it is determined whether or not the calculated buffer allocation amount is equal to or greater than a predetermined reference value (step C2). This reference value represents the minimum capacity of immediate data buffer that the disk array apparatus 2 allocates to one host. The reference value is pre-set by the manager based on the process performance, buffer capacity, etc. of the disk array apparatus 2, and is stored in the data storage area 34. This reference value is set because if the capacity of immediate data buffer to be allocated to each host is too small, the process performance can not be improved. If the calculated buffer allocation amount is smaller than this predetermined reference value (step C2:

No), the buffer allocation is unsuccessful (step C10). In this case, allocation of the immediate data buffer 33 to the new login host 1a is not performed.

If the calculated buffer allocation amount is equal to or greater than the predetermined reference value (step C2: Yes), the buffer allocation unit 35 attempts to secure the buffer allocation amount of the new login host 1a in the immediate data buffer 33 (step C3). Next, it is determined whether or not the buffer allocation amount is secured (step C4). If there is enough free space in the immediate data buffer 33, the buffer allocation amount is secured (step C4: Yes), and the buffer allocation is regarded as successful (step C9).

On the contrary, there might be a case where the immediate data buffer 33 has been allocated to several hosts 1 at the time in question and there is not enough free space, and the buffer allocation amount calculated for the new login host 1a can not be secured (step C4: No). In this case, the flow goes to step C5, and thereafter, the buffer freeing unit 37 frees the buffer allocation amount in the immediate data buffer 33 allocated to a host 1 having a smaller priority value than the new login host 1a, and applies the freed buffer allocation amount to the buffer allocation amount of the new login host 1a.

First, the buffer allocation unit 35 extracts hosts 1 whose buffer allocation amounts are reallocated to the new login host 1a from the hosts 1 to which the immediate data buffer 33 is now allocated (step C5). Specifically, the buffer allocation unit 35 searches for hosts 1 having a smaller priority value than the new login host 1a in the order of smaller priority value, among the hosts 1 which are now logging in and using the immediate data buffer 33. This search is continued until "sum total of buffer allocation amounts of searched-out hosts 1≧buffer allocation amount of new login host 1a" is satisfied. The buffer allocation unit 35 stops searching at the time the accumulated value of buffer allocation amounts of the searched-out hosts 1 reaches the buffer allocation amount of the new login host 1a, and extracts the searched-out hosts 1 as the hosts 1 whose buffer allocation amounts are reallocated to the new login host 1a. The priority value table T2 is referred to for this search.

Next, it is determined whether or not the extraction of hosts in step C5 is successful (step C6). If the extraction is successful, i.e., in a case where it is turned out that the buffer allocation amount of the new login host 1a can be secured by freeing the buffer allocation amount of one or more hosts 1 having a smaller priority value (step C6: Yes), the buffer freeing unit 37 requests re-login to the extracted hosts 1 for making them to re-log into the disk array apparatus 2 (step C7). This re-login request is made by the buffer freeing unit 37 performing an operation that anticipates re-login of the hosts 1. Such an operation includes sending of an Asynchronous Message defined by iSCSI, and disconnection of the connection by FIN or RST of TCP/IP protocol, etc. The hosts 1 that receive the re-login request once log out from the disk array apparatus 2. Since the resource occupied by the hosts 1 is freed due to the logout of the hosts 1, the immediate data buffer 33 allocated to the hosts 1 that have logged out is freed and the buffer allocation amount of the new login host 1a is secured (step C8). If the buffer allocation amount is secured in this way, the buffer allocation is regarded as successful (step C9). In a case where the buffer allocation is successful the login determination unit 32 declares "immediate data=no" in the negotiation performed when the hosts 1 that have been extracted for re-login request re-log into the disk array apparatus 2. Due to this, buffer allocation for them is rejected and immediate data transfer is not permitted.

On the contrary, in a case where it is determined in step C6 that extraction of hosts is unsuccessful (step C6: No), that is, in a case where the necessary allocation amount cannot be secured by freeing all the buffer allocation amounts of the hosts 1 having a smaller priority value than the new login host 1a, the buffer allocation is regarded as unsuccessful (step C10). In this case, allocation of the immediate data buffer 33 to the new login host 1a is not performed because it is determined that the buffer allocation amount of the new login host 1a cannot be secured.

Figure 6:
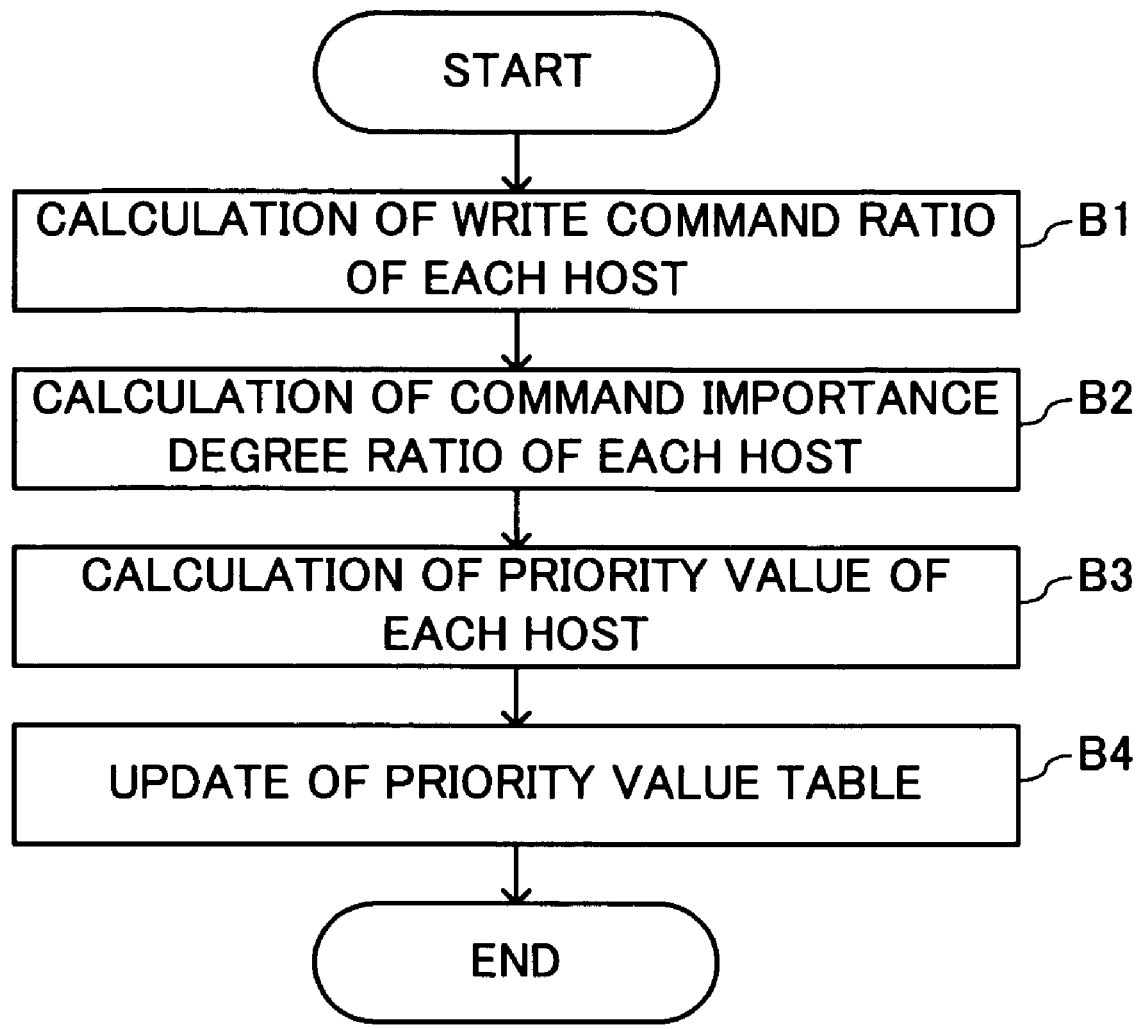
FIG. 6 is a flowchart for explaining a priority value recalculation process in step A5 of FIG. 5.
Figure 7:
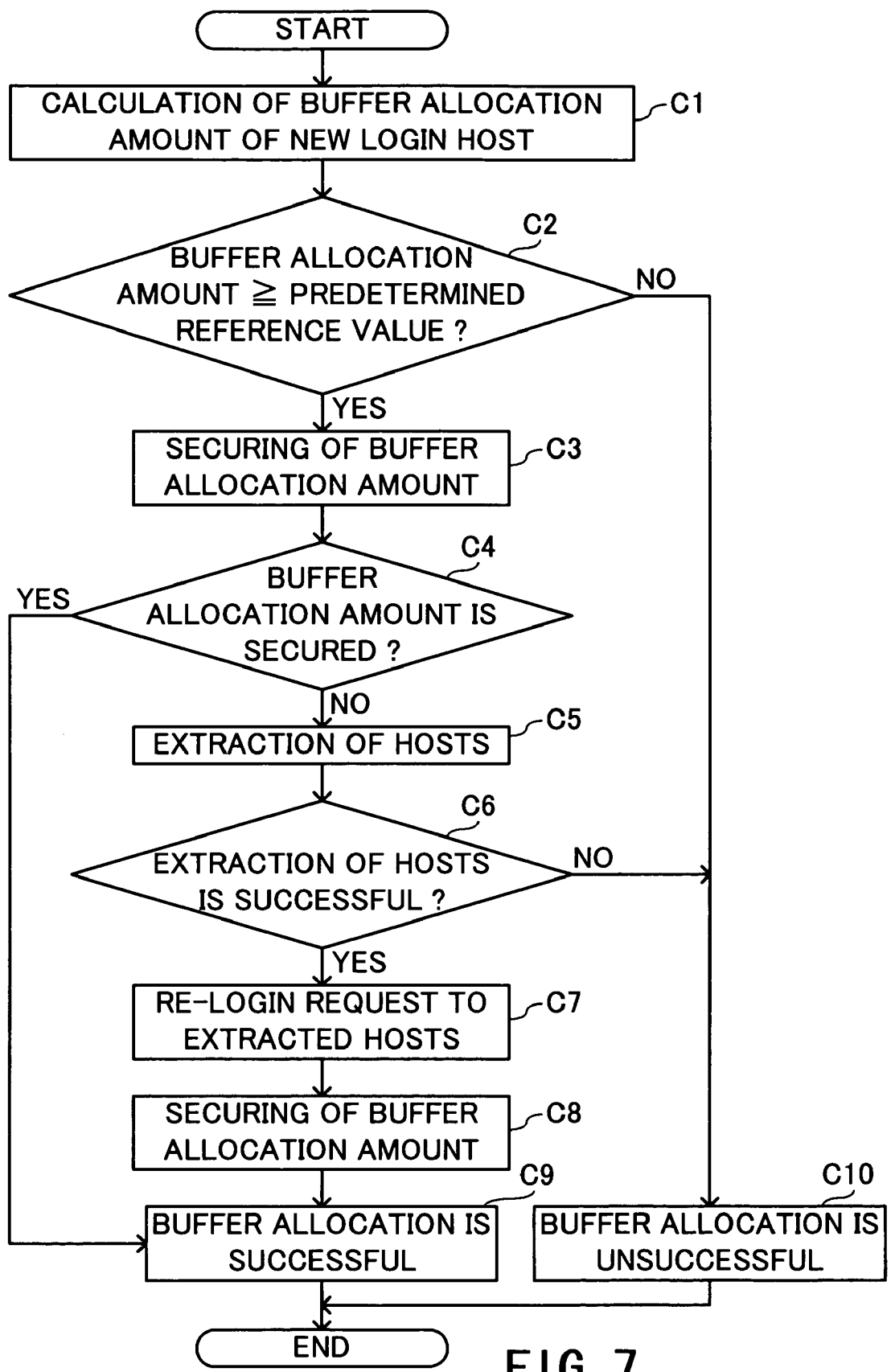
FIG. 7 is a flowchart for explaining a buffer allocation process in step A6 of FIG. 5.

By controlling the disk array system in accordance with the processes shown in FIG. 5, FIG. 6, and FIG. 7, it is possible to allocate the immediate data buffer preferentially to the host which is high in the priority order and to achieve an effective use of the immediate data buffer thus improvement in the performance of the whole system.

In the process shown in FIG. 5 for allocating the buffer to the host that newly logs in, the procedure of recalculating the priority value in step A5 is not indispensable. Therefore, the flow may advance from step A4 to step A6. In this case, for example, the priority value before recalculation or the initial priority value may be used instead of a priority value obtained after recalculation. The manner of recalculating the priority value shown in FIG. 6 is not limited to the one described above, but the priority value may be recalculated in other manners. For example, it may be recalculated in such a manner that the priority value of a host that has not performed immediate data transfer for a predetermined period of time is decreased. In FIG. 7, in a case where there is not enough free space of immediate data buffer to be allocated to the new login host, the immediate data buffer allocated to other hosts is transferred to the new login host in steps C5 to C8. However, in this case, it may be determined that the buffer allocation is unsuccessful.

Next, a process for dynamic reallocation of the immediate data buffer 33 in the disk array apparatus 2 will be explained with reference to FIG. 8. The disk array apparatus 2 according to the present invention performs recalculation of the priority value of the host 1 regularly or upon an arbitrary trigger, and reallocates the immediate data buffer 33 to each host 1 that logs in based on the recalculated value. That is, the buffer allocation amount can be dynamically changed upon a trigger. The trigger for performing the dynamic reallocation may be an operation or a setting by the manager, detection of login by a new host, detection of logout by a host, etc. The disk array apparatus 2 may track the usage of the immediate data buffer 33, and may perform reallocation when the usage frequency of a given host reaches or exceeds a predetermined level.

Figure 8:
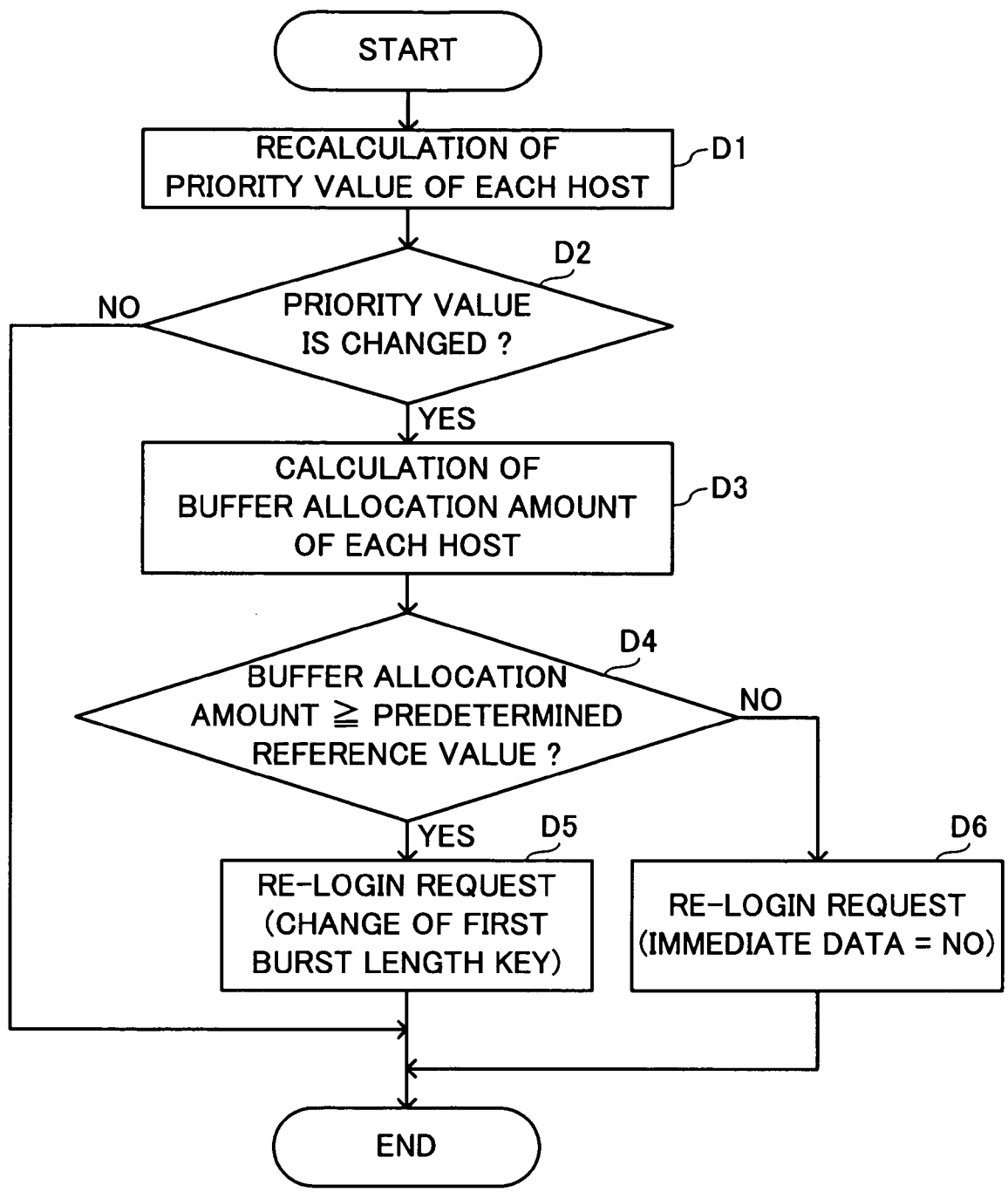
FIG. 8 is a flowchart for explaining a process for dynamic reallocation of the immediate data buffer.

As shown in FIG. 8, in the reallocation of the immediate data buffer 33, when the trigger for performing the dynamic reallocation is pulled, the priority value of each host 1 that is logging in is recalculated (step D1). This recalculation is performed by the priority value recalculation unit 36 in the same way as steps B1 to B3 in FIG. 6. Due to this, the priority value registered on the priority value table T2 shown in FIG. 4B is updated. Next, it is determined whether or not the priority value is changed as the result of the recalculation (step D2). In a case where there is no change in the priority value of any host 1 as the result of the recalculation, it is not necessary to change the buffer allocation amount and the process is therefore terminated (step D2: No). In a case where there is a change in the priority value (step D2: Yes), the flow goes to step D3, wherein and whereafter the buffer allocation unit 35 performs reallocation of the immediate data buffer 33. First, as in step C1 of FIG. 7, the buffer allocation unit 35 calculates the buffer allocation amount of each host 1 (step D3). However, unlike step C1, the buffer allocation unit 35 calculates the buffer allocation amount of all the hosts 1 that log in. For example, the buffer allocation amount of the host 1b is calculated by "immediate data buffer allocation amount of host 1b=(priority value of host 1b/sum total of priority values of all hosts 1 that currently log in)×maximum buffer capacity". Note that buffer allocation amount≦predetermined maximum value must be satisfied. Next, as in step C2 of FIG. 7, it is determined whether or not the calculated buffer allocation amount is equal to or greater than a predetermined reference value (step D4). This reference value represents the minimum capacity of immediate data buffer that the disk array apparatus 2 allocates to one host. The reference value is pre-set by the manager based on the process performance, buffer capacity, etc. of the disk array apparatus 2, and is stored in the data storage area 34.

If the calculated buffer allocation amount is equal to or greater than the predetermined reference value (step D4: Yes), the buffer allocation unit 35 updates the buffer allocation amount on the priority value table T2 shown in FIG. 4B, and requests re-login to the host 1 whose calculated buffer allocation amount is equal to or greater than the reference value, for making this host 1 to re-log into the disk array apparatus 2 (step D5). The login determination unit 32 sets the recalculated buffer allocation amount of the host 1 which receives the re-login request to a parameter (first burst length key value), in the negotiation performed at the time of re-login. Due to this, the first burst length key is changed and the intended change in the buffer allocation amount is achieved.

In a case where the calculated buffer allocation amount is smaller than the predetermined reference value (step D4: No), the buffer allocation unit 35 also requests re-login to the host 1 whose calculated buffer allocation amount is smaller than the reference value (step D6). The login determination unit 32 declares "immediate data no" to the host 1 which receives the re-login request, in the negotiation performed at the time of re-login. Due to this, buffer allocation for them is rejected and this host 1 is not permitted to use the immediate data buffer.

By performing reallocation of the immediate data buffer 33 in this manner, it is possible to realize a buffer allocation state that is best suited to the condition at each occasion.

In the process shown in FIG. 5 for allocating the buffer to the host that newly logs in, the priority value of each host is recalculated in step A5. Therefore, the buffer allocation amount of each host may be changed based on the priority value recalculated in step A5, not by recalculating the priority value in step D1.

As specifically explained above, the disk array apparatus according to an embodiment of the present invention manages the priority value for each host that logs in, and determines the buffer allocation amount based on the priority value. Due to this, the disk array apparatus can increase the buffer allocation amount of the host whose command should be processed preferentially, and can decrease the buffer allocation amount of the host whose command needs not be processed preferentially. Therefore, according to the present invention, the ability of the host which is high in the priority order is fully utilized, and the process performance of the whole system is improved.

The disk array apparatus according to an embodiment of the present invention changes the parameter by recalculating the priority value regularly or upon an arbitrary trigger, requesting re-login to the hosts, and re-performing login negotiation. Therefore, according to the present invention, the buffer allocation amount can be dynamically changed based on the recalculated priority value, and a buffer allocation state that is best suited to the condition at each occasion can be built.

The preferred embodiments of the present invention have been explained as described above. The present invention can be structured as various other embodiments. For example, the information recording apparatus according to the present invention may be other apparatuses than a disk array apparatus. Immediate data transfer on iSCSI has been described in the above embodiments, but the present invention can be widely applied to apparatuses that use a protocol adopting a transfer method where data transfer is started without waiting for a data transfer request from the command reception side after a write command is issued. In the above-described embodiments, permission or rejection of immediate data transfer is determined or the first burst length key value is changed by re-login. In addition, the present invention may be designed such that other iSCSI parameters like Max Connections that can only be set in the negotiation at the time of login are changed at the time of re-login. The priority value recalculation unit 36 in FIG. 2 may determine the degree of priority (priority degree) such as, for example, an order of priority of the host 1.

Further, the host adaptor 3 may be realized not by a dedicated device but by an ordinary computer system.

For example, by installing on a computer, a computer program for controlling the computer to perform the above-described operations, it is possible to make this computer to function as the host adaptor 3. The computer program may be recorded on a computer-readable recording medium such as a floppy disk, a CD-ROM, a hard disk, etc., or may be uploaded on a server on a network. Then, the computer program may be installed on a computer through distribution in a recording medium or downloading via a network.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2003-162789 filed on Jun. 6, 2003 and including specification, claims, drawings and summary. The disclosure of the above Japanese Patent Application is incorporated herein by reference in its entirety.

What is claimed is:

1. An information recording apparatus storing data received from a plurality of host computers, said information recording apparatus comprising:
 a buffer memory having a buffer area for temporarily storing said data;
 a memory storing a priority degree for each of said host computers, said priority degree being dynamically updated based on a status of said data received from corresponding one of said host computers;
 a buffer allocation unit dynamically allocating portions of said buffer area to said host computers, said portions of said buffer area allocated to said host computers having respective amounts determined based on said priority degrees of said host computers;

a login determination unit determining whether or not a host computer logged into said information recording apparatus; and a priority degree determination unit;

wherein:

said memory stores an initial priority degree which is pre-set for each of said host computers, and a reference priority degree representing a threshold level for the initial priority degrees;

said login determination unit determines whether or not the initial priority degree of a host computer stored in said memory is higher than the reference priority degree stored in said memory, when said host computer logs into said information recording apparatus;

said buffer allocation unit allocates a portion of said buffer area corresponding to the determined amount to said host computer, in a case where said login determination unit determines that the initial priority degree of said host computer is higher than the reference priority degree;

said memory stores for each host computer data representing the status corresponding to an amount of data and/or a usage degree of various commands received from the host computer and from a time the host computer logged into said information recording apparatus;

said priority degree determination unit determines the priority degree of each host computer that is stored in said memory and updating the stored priority degree, based on the amount of data and/or the usage degree of various commands and the initial priority degree stored in said memory;

said buffer allocation unit determines a reallocation amount of a portion of said buffer area to be allocated to each host computer that has been logged into said information recording apparatus based on the priority degree determined by said priority degree determination unit, and allocates a portion of said buffer area corresponding to the determined reallocation amount to each host computer;

the priority degree is a numerical value, said value being large when the priority degree is high, while being small when the priority degree is low; and said priority degree determination unit determines the priority degree of a host computer by "(the amount of data transferred from said host computer/total amounts of data transferred from all host computers to which portions of said buffer area are allocated)+(the usage degree of various commands from said host computer/total of usage degrees of various commands from all host computers to which portions of said buffer area are allocated)+the initial priority degree of said host computer".

2. An information recording apparatus storing data received from a plurality of host computers, said information recording apparatus comprising:

a buffer memory having a buffer area for temporarily storing said data;

a priority degree determination unit;

a memory storing a priority degree for each of said host computers, said priority degree being dynamically updated based on a status of said data received from corresponding one of said host computers; and a buffer allocation unit dynamically allocating portions of said buffer area to said host computers, said portions of said buffer area allocated to said host computers having respective amounts determined based on said priority degrees of said host computers;

wherein:

the priority degree is a numerical value, said value being large when the priority degree is high, while being small when the priority degree is low, wherein said priority degree determination unit determines the priority degree of each of said host computers by "(an amount of data transferred from said host computer/total amounts of data transferred from all host computers to which portions of said buffer area are allocated)+(a usage degree of various commands from said host computer/total of usage degrees of various commands from all host computers to which portions of said buffer area are allocated)+an initial priority degree of said host computer"; and said buffer allocation unit determines an amount of a portion of said buffer area to be allocated to each of said host computers by "(the priority degree of said host computer/total of the priority degrees of all host computers to which portions of the buffer area are allocated) a whole capacity of said buffer memory".

3. The information recording apparatus according to claim 1, further comprising a login determination unit determining whether or not a host computer logged into said information recording apparatus, wherein:

said memory stores an initial priority degree which is pre-set for each of said host computers, and a reference priority degree representing a threshold level for the initial priority degrees;

said login determination unit determines whether or not the initial priority degree of a host computer stored in said memory is higher than the reference priority degree stored in said memory, when said host computer logs into said information recording apparatus; and said buffer allocation unit allocates a portion of said buffer area corresponding to the determined amount to said host computer, in a case where said login determination unit determines that the initial priority degree of said host computer is higher than the reference priority degree.

4. The information recording apparatus according to claim 1, further comprising a buffer freeing unit freeing portions of said buffer area already allocated to host computers, on a basis of host computer by host computer, wherein in a case where said buffer allocation unit cannot secure a portion of said buffer area corresponding to the determined amount in said buffer memory when attempting to allocate a portion of said buffer area to a host computer:

said buffer freeing unit frees a portion of said buffer area already allocated to another host computer for which a priority degree lower than that of said host computer is set, based on a predetermined condition; and said buffer allocation unit allocates a portion of said buffer area corresponding to the determined amount to said host computer, in a case where a portion of said buffer area corresponding to the determined amount can be secured in said buffer memory due to the freeing of the portion of said buffer area by said buffer freeing unit.

5. The information recording apparatus according to claim 3, further comprising a priority degree determination unit, wherein:

said memory stores for each host computer data representing the status corresponding to an amount of data and/or a usage degree of various commands received from the host computer and from a time the host computer logged into said information recording apparatus;

said priority degree determination unit determines the priority degree of each host computer that is stored in said memory and updating the stored priority degree, based on the amount of data and/or the usage degree of various commands and the initial priority degree stored in said memory; and said buffer allocation unit determines a reallocation amount of a portion of said buffer area to be allocated to each host computer that has been logged into said information recording apparatus based on the priority degree determined by said priority degree determination unit, and allocates a portion of said buffer area corresponding to the determined reallocation amount to each host computer.

6. An information recording apparatus storing data received from a plurality of host computers, said information recording apparatus comprising:

a buffer memory having a buffer area for temporarily storing said data;

a priority degree determination unit;

a memory storing a priority degree for each of said host computers, said priority degree being dynamically updated based on a status of said data received from corresponding one of said host computers, wherein said priority degree determination unit determines the priority degree of each of said host computers by "(an amount of data transferred from said host computer/total amounts of data transferred from all host computers to which portions of said buffer area are allocated)+(a usage degree of various commands from said host computer/total of usage degrees of various commands from all host computers to which portions of said buffer area are allocated)+an initial priority degree of said host computer";

a buffer allocation unit dynamically allocating portions of said buffer area to said host computers, said portions of said buffer area allocated to said host computers having respective amounts determined based on said priority degrees of said host computers;

a buffer freeing unit freeing portions of said buffer area already allocated to host computers, on a basis of host computer by host computer;

a login determination unit determining whether or not a host computer logged into said information recording apparatus;

wherein in a case where said buffer allocation unit cannot secure a portion of said buffer area corresponding to the determined amount in said buffer memory when attempting to allocate a portion of said buffer area to a host computer:

said buffer freeing unit frees a portion of said buffer area already allocated to another host computer for which a priority degree lower than that of said host computer is set, based on a predetermined condition; and said buffer allocation unit allocates a portion of said buffer area corresponding to the determined amount to said host computer, in a case where a portion of said buffer area corresponding to the determined amount can be secured in said buffer memory due to the freeing of the portion of said buffer area by said buffer freeing unit; and wherein the freeing of the portion of said buffer area already allocated to a host computer by said buffer freeing unit is achieved in a manner that:

said buffer freeing unit requests said host computer to re-log into said information recording apparatus; and said login determination unit rejects allocation of a portion of said buffer area to said host computer, when said host computer re-logs into said information recording apparatus.

7. The information recording apparatus according to claim 5, wherein the allocation of the portion of said buffer area corresponding to the determined reallocation amount to each host computer by said buffer allocation unit is achieved in a manner that:

said buffer allocation unit requests each host computer to re-log into said information recording apparatus; and said login determination unit changes an amount of a portion of said buffer area to be allocated to each host computer, when each host computer re-logs into said information recording apparatus.

8. A buffer allocation method of allocating a portion of a buffer area of a buffer memory for temporarily storing data and included in a subordinate apparatus which stores data received from a plurality of superordinate apparatuses to each superordinate apparatus, said method comprising:

a priority degree determination step;

an allocation amount determination step of determining an amount of a portion of said buffer area to be allocated to each superordinate apparatus, based on a priority degree which is set for each superordinate apparatus and stored in a memory of said subordinate apparatus, wherein said priority degree determination step determines the priority degree of each of said superordinate apparatuses by "(an amount of data transferred from said superordinate apparatus/total amounts of data transferred from all superordinate apparatuses to which portions of said buffer area are allocated)+(a usage degree of various commands from said superordinate apparatus/total of usage degrees of various commands from all superordinate apparatuses to which portions of said buffer area are allocated)+an initial priority degree of said superordinate apparatus"; and a buffer allocating step of allocating a portion of said buffer area corresponding to the amount determined in said allocation amount determination step to a superordinate apparatus for which a high priority degree is set, preferentially over a superordinate apparatus for which a low priority degree is set;

wherein in said allocation amount determination step, an amount of a portion of said buffer area to be newly allocated to a new superordinate apparatus to which a portion of said buffer area has not yet been allocated, is determined, and said buffer allocating step includes:

an amount securing determination step of determining whether or not a portion of said buffer area corresponding to the amount determined in said allocation amount determination step can be secured in said buffer memory;

a buffer freeing step of freeing portions of said buffer area already allocated to some or all of superordinate apparatuses for which a priority degree lower than that of said new superordinate apparatus is set, in a case where it is determined in said amount securing determination step that the portion of said buffer area cannot be secured; and a newly allocating step of allocating a portion of said buffer area corresponding to the amount determined in said allocation amount determination step to said new superordinate apparatus, by assigning amounts of portions of said buffer area freed in said buffer freeing step to the amount determined in said allocation amount determination step;

said buffer freeing step includes:

a re-login requesting step of requesting a superordinate apparatus to which a portion of said buffer area is already allocated, to re-log into said subordinate apparatus; and an allocation rejecting step of rejecting allocation of a portion of said buffer area to said superordinate apparatus, when said superordinate apparatus re-logs into said subordinate apparatus in accordance with a request in said re-login requesting step, and the freeing of portions of said buffer area in said buffer freeing step is realized by rejection of allocation of a portion of said buffer area in said allocation rejecting step.

9. The buffer allocation method according to claim 8, further comprising a priority degree changing step of changing the priority degree of each superordinate apparatus stored in said memory, wherein:

in said allocation amount determination step, a reallocation amount of a portion of said buffer area to be allocated to each superordinate apparatus that has been logged into said subordinate apparatus is determined based on the priority degree changed in said priority degree changing step; and in said buffer allocating step, a portion of said buffer area corresponding to the reallocation amount determined in said allocation amount determination step is allocated to each superordinate apparatus.

10. The buffer allocation method according to claim 9, wherein said buffer allocating step includes:

a re-login requesting step of requesting each superordinate apparatus that has been logged into said subordinate apparatus to re-log into said subordinate apparatus; and an amount changing step of changing the amount of the portion of said buffer area to be allocated to each superordinate apparatus, when each superordinate apparatus re-logs into said subordinate apparatus in accordance with a request in said re-login requesting step, and the allocation of a portion of said buffer area corresponding to the reallocation amount to each superordinate apparatus in said buffer allocating step is realized by changing of the amount of the portion of said buffer area to be allocated to each superordinate apparatus in said amount changing step.

11. A computer-readable recording medium storing a computer program for allocating a portion of a buffer area of a buffer memory for temporarily storing data and included in a subordinate apparatus which stores data received from a plurality of superordinate apparatuses to each superordinate apparatus, said computer program comprising:

a priority degree determination step;

an allocation amount determination step of determining an amount of a portion of said buffer area to be allocated to each superordinate apparatus, based on a priority degree which is set for each superordinate apparatus and stored in a memory of said subordinate apparatus, wherein said priority degree determination step determines the priority degree of each of said superordinate apparatuses by "(an amount of data transferred from said superordinate apparatus/total amounts of data transferred from all superordinate apparatuses to which portions of said buffer area are allocated)+(a usage degree of various commands from said superordinate apparatus/total of usage degrees of various commands from all superordinate apparatuses to which portions of said buffer area are allocated)+an initial priority degree of said superordinate apparatus"; and a buffer allocating step of allocating a portion of said buffer area corresponding to the amount determined in said allocation amount determination step to a superordinate apparatus for which a high priority degree is set, preferentially over a superordinate apparatus for which a low priority degree is set;

wherein in said allocation amount determination step, an amount of a portion of said buffer area to be newly allocated to a new superordinate apparatus to which a portion of said buffer area has not yet been allocated, is determined, and said buffer allocating step includes:

an amount securing determination step of determining whether or not a portion of said buffer area corresponding to the amount determined in said allocation amount determination step can be secured in said buffer memory;

a buffer freeing step of freeing portions of said buffer area already allocated to some or all of superordinate apparatuses for which a priority degree lower than that of said new superordinate apparatus is set, in a case where it is determined in said amount securing determination step that the portion of said buffer area cannot be secured; and a newly allocating step of allocating a portion of said buffer area corresponding to the amount determined in said allocation amount determination step to said new superordinate apparatus, by assigning amounts of portions of said buffer area freed in said buffer freeing step to the amount determined in said allocation amount determination step;

said buffer freeing step includes:

a re-login requesting step of requesting a superordinate apparatus to which a portion of said buffer area is already allocated, to re-log into said subordinate apparatus; and an allocation rejecting step of rejecting allocation of a portion of said buffer area to said superordinate apparatus, when said superordinate apparatus re-logs into said subordinate apparatus in accordance with a request in said re-login requesting step, and the freeing of portions of said buffer area in said buffer freeing step is realized by rejection of allocation of a portion of said buffer area in said allocation rejecting step.

12. The computer-readable recording medium storing the computer program according to claim 11, wherein:

said computer program further comprises a priority degree changing step of changing the priority degree of each superordinate apparatus stored in said memory;

in said allocation amount determination step, a reallocation amount of a portion of said buffer area to be allocated to each superordinate apparatus that has been logged into said subordinate apparatus is determined based on the priority degree changed in said priority degree changing step; and in said buffer allocating step, a portion of said buffer area corresponding to the reallocation amount determined in said allocation amount determination step is allocated to each superordinate apparatus.

13. The computer-readable recording medium storing the computer program according to claim 12, wherein said buffer allocating step includes:

a re-login requesting step of requesting each superordinate apparatus that has been logged into said subordinate apparatus to re-log into said subordinate apparatus; and an amount changing step of changing the amount of the portion of said buffer area to be allocated to each superordinate apparatus, when each superordinate apparatus re-logs into said subordinate apparatus in accordance with a request in said re-login requesting step, and the allocation of a portion of said buffer area corresponding to the reallocation amount to each superordinate apparatus in said buffer allocating step is realized by changing of the amount of the portion of said buffer area to be allocated to each superordinate apparatus in said amount changing step.

* * * * *